March 18, 1952     A. F. KIPPER     2,589,615
MIXING MACHINE
Filed May 21, 1948     2 SHEETS—SHEET 1
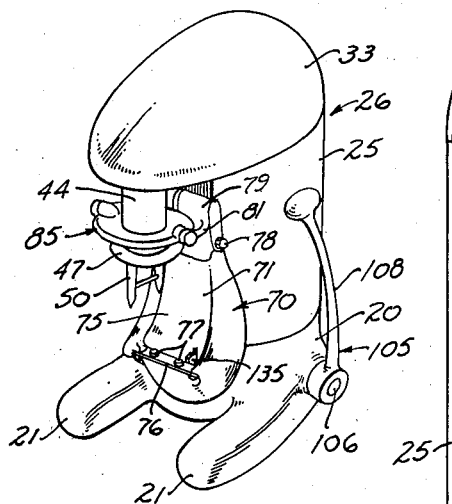
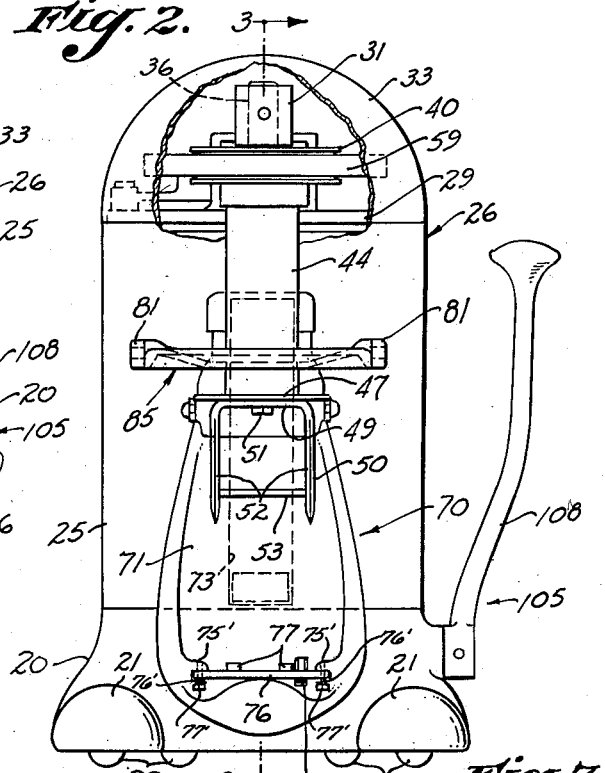
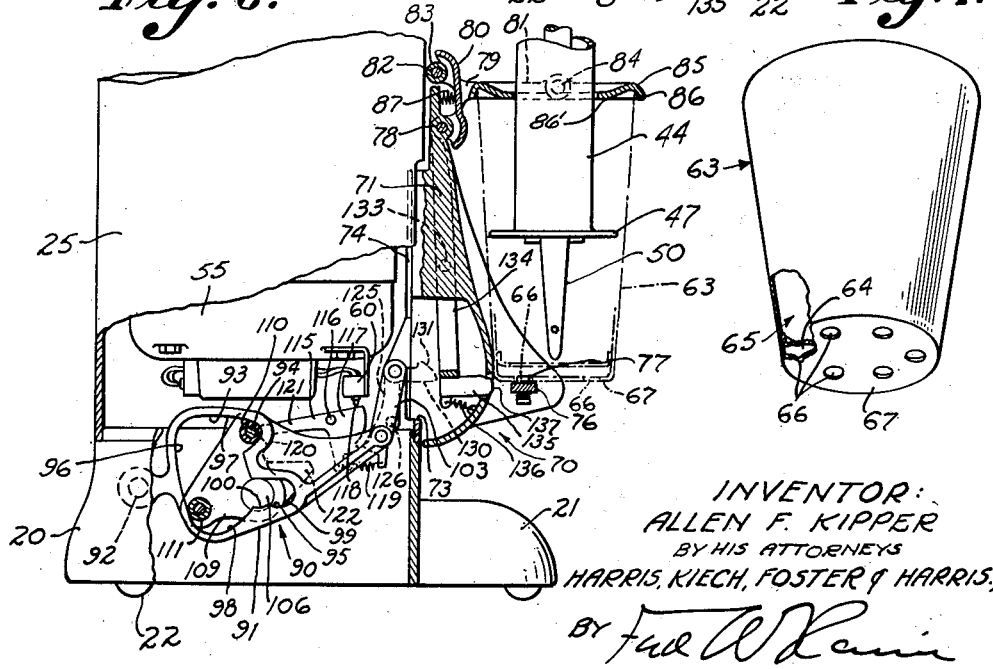
INVENTOR:
ALLEN F. KIPPER
BY HIS ATTORNEYS
HARRIS, KIECH, FOSTER & HARRIS, March 18, 1952     A. F. KIPPER     2,589,615
MIXING MACHINE
Filed May 21, 1948                              2 SHEETS—SHEET 2
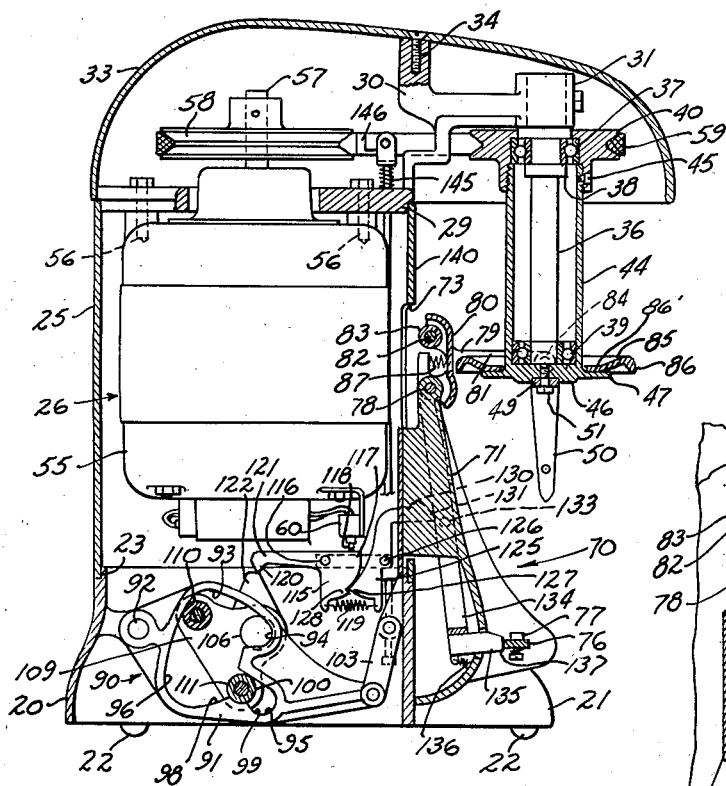
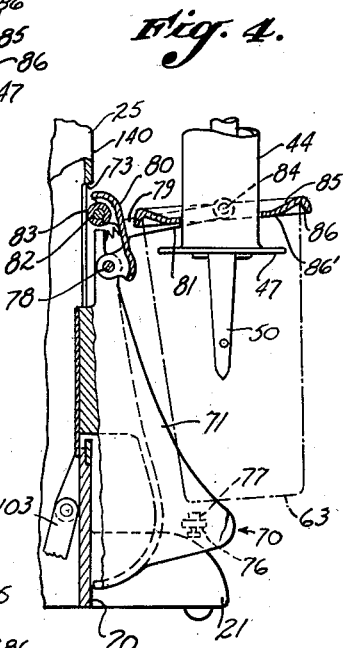
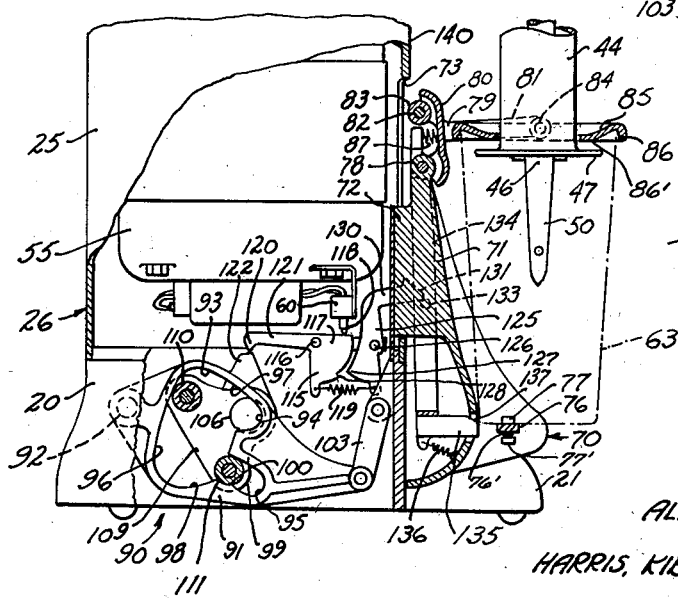
INVENTOR:
ALLEN F. KIPPER
BY HIS ATTORNEYS
HARRIS, KIECH, FOSTER & HARRIS, Patented Mar. 18, 1952

2,589,615

UNITED STATES PATENT OFFICE 2,589,615

MIXING MACHINE

Allen F. Kipper, Glendale, Calif., assignor to Arden Farms Co., Los Angeles, Calif., a corporation of Delaware Application May 21, 1948, Serial No. 28,295

21 Claims. (Cl. 259—108)

This invention relates generally to mixing machines and particularly to that type of machine commonly employed in drinking establishments for mixing ice cream drinks such as "shakes," malts, etc. The present application is a continuation-in-part of my prior application entitled Mixing Machine, Serial No. 722,009, filed January 14, 1947, now Patent No. 2,463,697, dated March 8, 1949.

Various types of portable mixing devices are employed for mixing or combining ingredients such as ice cream, milk and syrup to produce iced drinks, e. g., those named above. The most common type of mixing device consists of a standard having an electric motor at its upper end, the armature shaft of the motor projecting downwardly and carrying an agitator element adapted to enter a container to mix the contents thereof, the container being usually frictionally gripped on the standard and adapted to close a switch disposed on the standard and included in the electric circuit for the motor. In mixing devices of this character, the container is, in effect, suspended from the standard and, since its bottom end is unsupported, the container is unstable and is apt to be accidentally shaken from the gripping means. Moreover, such mixers are made relatively small for convenience in moving them from place to place and since they employ electric motors of small capacity, considerable time is consumed in completing the mixing operation with the result that a plurality of the mixers are necessary to fill the many orders in a large establishment. In an effort to obviate the faults of such small-size mixers it has been proposed to use a mixing device or machine of larger proportions, employing a motor of greater horsepower capable of performing the mixing operation in a fraction of the time usually required to thoroughly mix and beat the ingredients. Such machines are adapted particularly for use in mixing relatively thick malts and shakes and, generally speaking, have been quite satisfactory in use. These machines, while being an improvement over mixers of the light-weight, portable type, have certain deficiencies. For example, it has been determined that the ice cream mixture is apt to spill out of the open end of the container due to the rapid rotation of the agitator element, causing loss of the mixture and soiling the clothes of the fountain attendant. Moreover, the spindle or shaft of the agitator is rotatable in bearings which are exposed so that the mixture sometimes contacts and congeals thereon and this not only causes wear on the bearings but retards the rotation of the agitator element and contaminates other drinks subsequently mixed. In addition, in such machines the container is placed on a vertically slidable holder or support member which is raised and lowered by manually operable means to effect relative movement of the container and agitator element, this movement causing the agitator element to enter the container to perform the mixing operation, and, since no provision is made for preventing rotation of the container, it is necessary to grasp the container in one hand in order to restrain it from rotation. Due to the torque developed by the agitator and the fact that the metal container becomes very cold, it is extremely difficult to maintain a grip on the container, it having been found necessary to provide a longitudinal depression in the side of the container for the insertion of the fingers to provide a better hold on the container. Furthermore, mixing machines of this type may be started at any time, regardless of whether or not a container is used and it is thus possible to cause injury to the operator who may accidentally place his hand in contact with the rapidly rotating agitator element. A further deficiency of this type of mixer resides in the fact that no means are provided for removing the mixture from the agitator element following a mixing operation and thus, when the container is removed from the machine, the mixture drips from the element to cause an undesirable condition.

It is an object of my invention to avoid the faults of previously used mixing machines by providing a mixer of improved construction capable of rapidly and completely mixing ingredients in a container and one which may be operated with complete safety.

Another object of the invention is to provide a mixing machine of the character referred to having a vertically movable support for the container and cover means on the support adapted to automatically close the open end of the container when the container is placed on the support and during the mixing operation whereby to prevent spilling of the contents of the container.

Another object is to provide a mixer of a heavy duty type having means for engaging the container to positively prevent rotation thereof on its support during the mixing operation thereby avoiding the necessity of the operator to grip the container in the hand and enabling the operator to perform other duties in connection with the preparation of the drinks while attending the machine.

Another object is to provide a mixer of the type indicated in which the bearings for the agitator shaft or spindle are completely enclosed so that the danger of the mixture infiltrating into the bearings to impair their efficiency and cause an unsanitary condition is entirely avoided.

Another object is to provide a mixer of the type specified which includes an electric motor for rotating the agitator element and a control means operative in response to the placing of the container on its support and movement of the container toward the agitating means to permit energization of the electric motor. Through this provision, the mixer can be operated only after a container has been placed in the correct position in the mixer and the agitator element disposed in the container and thus the danger of injuring the hands by contact with the rotating agitator element is entirely eliminated. Another advantage of the container-operated control means is that it eliminates the possibility of starting the motor by shaking or jarring the machine.

Another object is to provide a mixer having a manually controlled cam means for raising and lowering the supporting means for the container, said cam means being so constructed and arranged that it is adapted to move the container through a full stroke toward the agitator element to cause the element to enter the container to a maximum extent while performing the mixing operation, to separate the container and agitator element to arrest the mixing operation, and to move the container toward the agitator element through a partial stroke so as to dispose the rotating element within the container but above the mixture so that any mixture adhering to the element will be thrown off therefrom by centrifugal force into the container.

Another object is to provide a mixer of the character referred to which employs a relatively large motor capable of rapidly mixing and beating the ingredients and having a braking device for promptly arresting the rotation of the agitator element at the completion of the operation.

Another object is to provide a mixer of a semi-portable type which is comparatively simple in construction and easy to service and one which is generally more efficient than previous machines used for like purposes.

Another object is to provide, in a mixing machine of the type indicated, means for positively maintaining the cover means in position to close the container during the mixing operation so as to protect and prevent spilling of the contents of the container.

A further object is to provide in a mixing machine means for controlling the energization and deenergization of the electric motor, said means being operative only in response to the precise sequence and combined acts of placing a container on the support means and thereafter raising the support means so that the possibility of starting the motor while the support means is in elevated position without a container mounted on the support means is entirely avoided and this safety feature prevents injury to a person who might raise the container support and then inadvertently strike the container engaging means while cleaning the mixing device.

Further objects of the invention will appear from the following specification and the drawings, which are intended for the purpose of illustration only, and in which:

Fig. 1 is a perspective view of my improved mixing machine;

Fig. 2 is an enlarged front elevational view of the mixing machine;

Fig. 3 is a cross-sectional view, taken on line 3—3 of Fig. 2, showing the relation of the various parts prior to the placing of a container in the device;

Fig. 4 is a fragmentary sectional view of the lower front portion of the mixing device illustrating the method of placing a container on the support member;

Fig. 5 is a view similar to Fig. 4, showing a container in place and ready to be raised to operative position;

Fig. 6 is a view similar to Fig. 3, showing the relation of the parts during a mixing operation; and Fig. 7 is a perspective view of the container used in the machine.

Referring to the drawings in detail, my improved mixing machine includes a substantially circular base member 20 having a pair of forwardly projecting feet 21 for adding rigidity to the structure. Resilient pads 22 are spaced around the lower edge of the base and are adapted to rest upon a container, shelf or other support to reduce vibration to a minimum. The upper rim of the base 20 is rabbeted as shown at 23 (Fig. 3) to adapt it to receive the lower end of a tubular upright member 25 which, together with the base member 20 provides a housing 26 for enclosing the operating parts of the machine. Attached to the upper end of the tubular member 25 is an annular closure member 29 provided with an arm or bracket 30 which projects upwardly and laterally and terminates in a cylindrical boss 31. A cap or hood member 33 is secured to the bracket 30 as by a screw 34 and encloses the driving and braking means to be later described, the hood having a forward portion which overlies the boss 31.

The boss 31 has a vertical bore in which is secured the upper end of a spindle 36 which projects downwardly from the boss. The spindle 36 is reduced in diameter at a point slightly below the boss 31 to adapt it to receive the inner race of a ball bearing 37 and is further reduced and threaded to receive a nut 38 (Fig. 3). On the lower reduced end of the spindle 36 is mounted a ball bearing 39. The ball bearing 37 is held in the bore of a grooved pulley 40 which has a depending hub provided with an axial threaded bore. The nut 38 is screwed upwardly on the threaded portion of the spindle 36 to retain the pulley 40 in position, the pulley being rotatable on the fixed spindle. Adapted to be screwed into the threaded bore of the pulley 40 is the upper end of a tubular shaft 44 which is held therein by a set screw 45. The lower end of the tubular shaft 44 is closed by a wall 46 and preferably this wall is extended laterally to provide a peripheral flange 47. In the lower surface of the wall 46 is a transverse groove for receiving the cross piece 49 of an inverted U-shaped agitator element 50, the cross piece being held in place by a screw 51 as shown in Fig. 3. The edges of the legs 52 of the agitator element 50 are preferably sharpened to provide knife edges adapted to cut through the ingredients being mixed to expedite the mixing thereof. The legs 52 may be connected by a rod-like strut 53 to strengthen the structure. It will be apparent from the above description and from an inspection of Fig. 3 of the drawings that the bearings 37 and 39 are entirely enclosed and thus the possibility of the mixture contacting therewith is avoided. Through this construction the bearings may be lubricated without danger of the lubricant contaminating the mixture.

The tubular shaft 44 and its attached agitator element 50 are adapted to be rotated at a comparatively fast speed by means of an electric motor 55. As shown in Fig. 3, the motor 55 is attached to and suspended from the annular closure member 29 by means of bolts 56, the motor being disposed within the tubular member 25 with its armature shaft 57 extending vertically. On the upper projecting end of the armature shaft 57 is a grooved pulley 58 which is adapted to drive the pulley 40 by means of a V-belt 59. Thus, when the electric motor 55 is energized it drives the agitator element at high speed through the medium of the pulleys 58 and 40 and the belt 59. The motor 55 is connected in an electric circuit which includes a push-button switch 60 (Figs. 3, 5 and 6) which is fastened to the lower end of the motor 55 and is operated by means to be described hereinafter.

The substances to be mixed are contained in a metal container 63 which, as shown in Fig. 7, is provided with a circular bottom wall 64 and an upstanding circular wall 65 which provides an open upper end. Spaced below the bottom wall 64 is a false bottom 67 provided with a series of spaced apertures 66 for a purpose to be presently explained.

The container 63 is adapted to be held by a supporting means indicated generally at 70. The supporting means 70 includes a hollow slide member 71 mounted to slide vertically on the tubular housing member 25. A pad 72 on the interior of the slide member 71 passes through a vertical opening 73 in the side of the member 25 to mount the member 71 for vertical sliding movement thereon, a curved plate 74 of greater width than the width of the opening being secured to the pad to retain the parts in this relationship. The front wall of the slide member 71 is curved to provide a recess 75 for receiving the container 63. Extending between the sides of the arcuate front portion of the member 71 adjacent the lower end thereof is a transverse strip 76 which constitutes a shelf for supporting the container 63. The shelf 76 has a pair of upstanding lugs 77 which are adapted to enter any two adjacent apertures 66 in the bottom of the container to prevent rotation of the container during the mixing operation. The shelf 76 is normally forced upwardly, to cause its end to engage against shoulders 75' on the slide member 71, by springs 76' which surround screws 77' which pass through holes in the shelf and are screwed into the member 71 (Fig. 2).

Carried at the upper narrowed end of the member 71 is a transverse pin 78 to the outer ends of which is pivoted a holder member 79. The member 79 includes a vertical portion 80, the lower end of which is pivoted on the pin 78, and a pair of spaced arms 81 projecting forwardly and horizontally from the vertical portion. Above the pivot pin 78, the holder member 79 carries a transverse pin 82 on which is rotatably mounted a roller 83. At their forward ends, the arms 81 carry pins 84 on which an annular cover member 85 is pivotally connected. The cover member 85 is of substantially inverted dish shape, being provided with a depending flared rim 86 and an intermediate spherical segmental portion 86'. The spherical portion 86' permits variation in the size of the circular opening at the upper end of the container 63 without losing contact between the parts and enables the container to be held concentric with the cover member regardless of such variation. The cover member 85 surrounds the tubular shaft 44 and, being pivoted at the ends of the arms 81, is adapted to slide vertically with respect to the agitator element 50. A spring 87 acting between the upper end of the support member 71 and the rear side of the holder member 79 normally acts to pivot the arms 81 downwardly to maintain the cover member seated against the flange 47. During the placing of the container 63 in the machine it is moved simultaneously upwardly to cause the agitator element 50 to enter the container and the upper rim of the container to engage the yieldable cover member 85 as shown in Fig. 4. The cover member 85 thus effectively closes the upper end of the container 63 to prevent spilling of its contents due to the turbulent action created by the agitator element during the mixing and beating operation. The mounting of the container 63 in the machine is completed by lowering it upon the shelf 76 and causing the lugs 77 to enter a pair of the apertures 66 in the bottom of the container as illustrated in Fig. 5. It is apparent from the above that the container 63 is held firmly between the resilient shelf 76 and the cover member 90 and is keyed against rotation by the engagement of the lugs 77 in the apertures 66.

The slide member 71 of the container supporting means 70 is slid upwardly to cause the agitator element 50 to move further into the container 63, as shown in Fig. 6, to better agitate and mix the ingredients. Vertical sliding movement of the member 71 and its attached container 63 is accomplished by cam means, indicated generally at 90 in Figs. 3 to 6. The cam means 90 includes a cam arm 91 which is pivoted within the housing base 20 on a transverse pin 92. The cam arm 91 has an opening 93 of irregular shape, the forward side of the opening having a pair of spaced recesses 94 and 95 while the rearward side 96 of the opening is straight. Adjacent the upper recess 94 the side of the opening 93 is formed with an inclined cam face 97 and adjacent the lower recess 95 the opening is provided with a pair of angular cam faces 98 and 99 and a flattened rest or dwell 100 at the point of intersection of the faces 98 and 99. The forward end of the cam arm 91 is operatively connected to a link 103 pivoted on the rearward face of the slide member 71 to provide that when the cam arm is pivoted, the slide member will be slid vertically on the housing 25.

The cam arm 91 is adapted to be pivoted by a manually operable means, indicated at 105. The manually operable means 105 includes a transverse shaft 106 which is rotatable in a bearing boss forming part of the base member 20. Secured to the outer projecting end of the shaft 106 is an operating handle 108 and fastened to its inner end is a triangularly shaped plate 109 which carries a pair of rollers 110 and 111. When the operating handle 108 is in the neutral position shown in Fig. 3, the rollers 110 and 111 are respectively located against the straight side 96 and upon the rest 100 of the cam opening 93 to maintain the cam arm 91 and slide member 71 in the lowermost or inoperative position shown in Fig. 3. To raise the slide member 71 and the container 63, the handle 108 is pivoted forwardly, whereupon the roller 110 will ride along the inclined cam surface 97 to pivot the cam arm 91 upwardly to the position shown in Fig. 6. At the end of this movement of the parts, the roller 110 will be located in the upper recess 94 while the other roller 111 will be against the straight face 96 of the opening 93. The shaft 106 and cam arm 91 are adapted to be held in their different positions by a spring pressed detent ball, shown in my prior patent, engageable in circumferentially spaced depressions in the shaft.

The switch 60 which is in the circuit for the electric motor 55 is normally open but adapted to be closed by an actuating member 115 which is pivoted on a cross-pin 116 within the base 20. The actuating member 115 has a segmental portion 117, the upper edge of which is adapted to engage and slide the plunger 118 of the switch 60 upwardly to close the switch when the actuating member is pivoted in counterclockwise direction under the action of a spring 119. The actuating member is, however, normally prevented from pivoting in this direction by two separate detent means. One of these detent means includes a follower lug 120 formed on an arm 121 of the actuating member and normally held in engagement with a relatively sharp or acute cam lobe 122 secured to the operating plate 109. When the shaft 106 and plate 109 are rotated from the position shown in Fig. 5 to that illustrated in Fig. 6 to raise the container support 71, the cam lobe 122 rides out from under the cam follower lug 120 to permit the switch-actuating member 115 to engage the plunger 118 of the micro action switch under the influence of the spring 119.

The second detent means, mentioned above, includes a latch member 125 which is pivoted on a cross-pin 126 within the base 20 and which has a tooth or pawl 127 which is normally held in engagement with a shoulder 128 formed on the curved edge of the portion 117 of the switch actuating member 115 under the action of the spring 119 which, as will be observed, is connected between the actuating member and the latch member. It will be apparent from the foregoing that when the latch member is in engagement with the shoulder 128, the actuating member can be withheld from pivotal movement in a direction which would close the switch, even though the arm 121 is released by the cam lobe 122.

The latch member 125 has an arm 130 which projects forwardly through an opening in the front side of the tubular member 25 and which is provided with a bevel end 131. The end 131 of the latch arm 130 is adapted to be engaged by a pin 133 extending between the sides of a U-shaped trip member 134 pivoted on the pin 78, when the trip member is pivoted from the position shown in Fig. 3 to that illustrated in Fig. 5, so as to pivot the latch member to the unlatching position shown in Fig. 5 and thus allow pivotal movement of the actuating member 115 to switch closing position. The trip member 134 carries a block 135 at its lower end, the member being normally pivoted to the position shown in Fig. 3, under the action of a spring 136, so as to maintain the block in position to be engaged by the side of the container 63 when the latter is placed on the support member 71, the block passing through an aperture 137 in the support member.

When the container 63 is properly placed on the shelf 76 its side engages and forces the block 135 inwardly or rearwardly, as shown in Fig. 5, so that the trip member 134 is pivoted rearwardly. During the placing of the container 63 in the machine, the cover member 85 is adapted to pivot upwardly to facilitate such insertion, the roller 83 of the cover holder member 79 entering the opening 73 in the housing member 25 as shown in Fig. 4. Pivotal movement of the trip member 134 causes the pin 133, carried by the trip member to engage the end 131 of the latch member 125 to pivot the latter in clockwise direction so as to displace its pawl 127 from the shoulder 128 of the switch actuating member 115, against the action of the spring 119. However, due to the fact that the follower lug 120 of the actuating member 115 rests upon the cam lobe 122 at this time, the actuating member is withheld from counterclockwise pivotal movement and thus cannot close the switch 60 and the electric motor 55 remains de-energized. It is thus seen that the presence of the container 63 on the support member 71 does not, in itself, initiate the mixing operation.

To start the mixing operation it is necessary to merely pivot the operating handle 108 forwardly, this action causing the plate 109 to rotate from the position shown in Fig. 5 to that illustrated in Fig. 6. During this movement the rollers 110 and 111, acting against the cam faces 97 and 96 of the cam plate 91, pivot the latter upwardly and, by means of the link 103, the support member 71, together with the container 63, is moved upwardly on the mixer housing 25. At this time, the roller 83 of the holder member 79 rides along a finished surface or pad 140 on the tubular housing member 25 and thus the holder member is held in position to prevent upward movement of the cover member 85 which, if permitted, would result in spilling of the contents of the container through the open end thereof.

When the support member 71 and container 63 have been moved upwardly to a position wherein the agitator element 50 is disposed within the lower portion of the container 63, the cam lobe 122 moves from under the cam follower lug 120, as shown in Fig. 6, so as to release the actuating member 115 and permit the same to pivot counterclockwise under the action of the spring 119. The portion 117 of the actuating member 115 is thus caused to engage the plunger 118 to close the switch 60 and thus energize the motor 55 which then drives the tubular spindle 44 and agitator element 50, at a relatively fast rate of speed, through the medium of the pulleys 58 and 40 and the belt 59. As the agitator element 50 is rotated at high speed it acts to cut through the mass of ice cream and thoroughly mix the same with the milk or other liquid at a very fast rate so that the entire mixing operation is performed in only a few seconds.

After the mixing operation has been completed, the operating handle 108 is moved rearwardly and, through means of the rollers 110 and 111, the cam plate 91 and link 103, the support member 71, together with the container and the cover member 85, is moved downwardly with respect to the agitator element 50. During this downward movement, the cam lobe 122 moves into position to again engage the cam follower lug 120 so that the switch actuating member 115 is restored to the inoperative position shown in Fig. 5 so as to open the switch 60 and thus de-energize the motor 55 to arrest the rotation of the agitator element. Connected to the support member 71 is a vertical rod 145 which is slidable in a hole in the plate 29, the upper end of the rod being operatively connected to a brake device indicated at 146 in Fig. 3 and shown in my pending application referred to previously. When the support member 71 approaches the extent of its downward movement and the motor 55 is de-energized, the rod 145 is pulled downwardly to actuate the brake device 146 to promptly arrest the rotation of the agitator element 50.

Due to the double control of the switch actuating means, the mixing operation is stopped even though the container 63 remains on the support member 71. In other words, movement of the actuating member 115 to switch closing position is effected in response to both the placing of the container 63 on the support member 71 and the subsequent raising of the support member to a predetermined height. On the other hand, movement of the switch actuating member 115 to switch opening position is responsive only to the downward movement of the support member 71. By this provision, the agitator element 50 is positively brought to rest before the container 63 is removed from the support member 71. It will also be apparent that since the latch member 125 can be pivoted to unlatching position by the pin 133 only when the support member 71 is in lowermost position, the possibility of starting the motor 55 by applying pressure against the block 135, when the support member has been raised for the purpose of facilitating cleaning of the machine, is entirely avoided and the danger of injuring the person performing the cleaning operation by contact with the agitator element 50 which might otherwise rotate, is eliminated. Thus, the present mixing machine is made entirely safe and foolproof. Since the energization of the motor 55 is dependent upon both the presence of a container properly positioned on the supporting means and the operation of the control handle 108, it will be apparent that accidental starting of the machine as by shaking or jarring or by inadvertently pressing a starting button or other means, as in prior mixing machines, is entirely avoided and the possibility of seriously injuring the hands by placing them against the rotating agitator element is eliminated.

It is desirable that any mixture which adheres to the agitator element 50 be removed therefrom and deposited in the container 63 so as to prevent dripping thereof onto the shelf, counter or other support upon which the machine is mounted. The present invention contemplates the removal of the mixture from the agitator element by rotating the element while the element is located adjacent the upper end of the container and above the contents thereof. To accomplish this result the cam arm 91 is moved upwardly to only a slight degree, this movement being effected by reverse movement of the rollers 110 and 111 in the cam opening of the cam member 91 of sufficient amplitude to slide the container supporting member 71 upwardly through only a partial stroke and to release the brake and close the switch 60. This operation is effected after the mixing operation has been completed and the cam arm 91 has been moved to the position shown in Fig. 5 and may be accomplished by merely moving the operating handle 108 rearwardly. As the agitator element 50 is rotated rapidly above the surface of the mixed contents of the container 63, particles or drops of the mixture which lightly adhere thereto are thrown off by centrifugal force against the inner surface of the container.

While I have herein shown and described the invention as embodied in a preferred form of construction, by way of example, it is to be understood that modifications may be made in the structure and arrangement of the parts without departing from the spirit of the invention. Consequently, I do not wish to be limited to the exact embodiment herein disclosed but desire to be afforded the full scope of the appended claims.

I claim as my invention:

1. A mixing device for mixing a substance in a container, including: a vertically movable supporting means for receiving and supporting the container; mixing means provided with a rotary agitator element fixedly disposed above said supporting means and adapted to be disposed within the container and to stir the contents of the container when said supporting means is moved toward said mixing means; power means for rotating said agitator element; switch means for selectively energizing and de-energizing said power means; pivoted actuating means for actuating said switch means; pivoted detent means normally engaged with said actuating means and operative to prevent pivotal movement of said actuating means to switch actuating position, said detent means being adapted to be pivoted in response to the placing of the container on said supporting means; and spring means for pivoting said actuating means when released by said detent means and upon predetermined upward movement of said supporting means so as to actuate said switch.

2. A mixing device for mixing a substance in a container, including: a vertically movable supporting means for receiving and supporting the container; manually operable means for moving said supporting means; mixing means provided with a rotary agitator element fixedly disposed above said supporting means and adapted to be disposed within the container and to stir the contents of the container when said supporting means is moved toward said mixing means; power means for rotating said agitator element; operating means for selectively energizing and de-energizing said power means; movable actuating means engageable with said manually operable means and adapted to actuate said operating means when moved in one direction, said actuating means being normally withheld from movement in said one direction by said manually operable means; and means for moving said actuating means in said one direction when released by said manually operable means at the completion of a predetermined upward movement of said supporting means.

3. A mixing device for mixing a substance in a container, including: a vertically movable supporting means for receiving and supporting the container; manually operable means for moving said supporting means, said manually operable means embodying cam means; mixing means provided with a rotary agitator element disposed above said supporting means and adapted to be disposed within the container and to stir the contents of the container when said supporting means is moved toward said mixing means; power means for rotating said agitator element; operating means for selectively energizing and de-energizing said power means; movable actuating means engageable with said cam means and adapted to actuate said operating means when moved in one direction, said actuating means being normally withheld from movement in said one direction by said cam means; and spring means for moving said actuating means in said one direction when released by said cam means at the completion of a predetermined upward movement of said supporting means.

4. A mixing device for mixing a substance in a container, including: a vertically movable supporting means for receiving and supporting the container; manually operable means for moving said supporting means, said manually operable means embodying cam means; mixing means provided with a rotary agitator element disposed above said supporting means and adapted to be disposed within the container and to stir the contents of the container when said supporting means is moved toward said mixing means; power means for rotating said agitator element; operating means for selectively energizing and de-energizing said power means; pivoted actuating means engageable with said manually operable means and adapted to actuate said operating means when pivoted in one direction, said actuating means being normally withheld from pivotal movement in said one direction by said manually operable means; and means for pivoting said actuating means in said one direction when released by said manually operable means at the completion of a predetermined upward movement of said supporting means.

5. A mixing device for mixing a substance in a container, including: a vertically movable supporting means for receiving and supporting the container; manually operable means for moving said supporting means, said manually operable means being selectively movable from a neutral position wherein said supporting means is in lowermost position to a forward position to elevate said supporting means, and also from said neutral position to a reverse position wherein said supporting means remains in lowermost position, said manually operable means embodying a cam lobe; mixing means provided with a rotary agitator element disposed above said supporting means and adapted to be disposed within said container and to stir the contents of the container when said supporting means is moved toward said mixing means; power means for rotating said agitator element; operating means for selectively energizing and de-energizing said power means; pivoted actuating means engageable with said cam lobe and adapted to actuate said operating means when pivoted in one direction, said actuating means being normally withheld from pivotal movement in said one direction by said cam lobe; and spring means for pivoting said actuating means in said one direction when released by said cam lobe at the completion of a predetermined movement of said manually operable means toward said forward position so as to energize said power means subsequent to the insertion of said agitator element in the container, said spring means being also adapted to pivot said actuating means in said one direction when released by said cam lobe during movement of said manually operable means to said reverse position so as to energize said power means when said supporting means is in lowermost position and said agitator element is disposed within the upper portion of the container.

6. A device as defined in claim 5 and including latch means normally engaged with said actuating means to withhold the same pivotal movement in said one direction, said latch means being adapted to be released from said actuating means only in response to the placing of the container on said supporting means so that rotation of said agitator element, when a container is not supported by said supporting means, is prevented.

7. A device as defined in claim 5 and including latch means normally engaged with said actuating means to withhold the same from pivotal movement in said one direction, said latch means being adapted to be released from said actuating means only in response to the placing of the container on said supporting means so that rotation of said agitator element, when a container is not supported by said supporting means, is prevented, said spring means being connected between said actuating means and said latch means.

8. A device as defined in claim 5 and including: latch means normally engaged with said actuating means to withhold the same from pivotal movement in said one direction; and movable trip means operative, in response to the placing of the container on said supporting means, to release said latch means so as to permit pivotal movement of said actuating means in said one direction.

9. A device as defined in claim 5 and including: latch means normally engaged with said actuating means to withhold the same from pivotal movement in said one direction; and pivoted trip means operative, in response to the placing of the container on said supporting means, to release said latch means so as to permit pivotal movement of said actuating means in said one direction.

10. A device as defined in claim 5 and including: latch means normally engaged with said actuating means to withhold the same from pivotal movement in said one direction; and trip means pivoted on said supporting means and operative, in response to the placing of the container on said supporting means, to release said latch means so as to permit pivotal movement of said actuating means in said one direction.

11. A device as defined in claim 5 and including: latch means normally engaged with said actuating means to withhold the same from pivotal movement in said one direction; and trip means pivotally connected to and movable with said supporting means, said trip means being operative, in response to the placing of the container on said supporting means, to release said latch means so as to permit pivotal movement of said actuating means in said one direction.

12. A device as defined in claim 5 and including: pivoted latch means normally engaged with said actuating means to withhold the same from pivotal movement in said one direction; and a trip member pivotally mounted on said supporting means and adapted to be engaged and pivoted by the container when placed on said supporting means, said trip member being adapted to engage and pivot said latch means only when pivoted by the container while said supporting means is disposed substantially in lowermost position, said latch means being adapted to release said actuating means when pivoted by said trip member so as to permit pivotal movement of said actuating means in said one direction.

13. A device as defined in claim 12 in which said latch means has an end disposed in the path of movement of said supporting means, and in which said trip member has a projection engageable with said end only when said supporting means is disposed substantially in lowermost position so that rotation of said agitator element cannot be initiated by pivoting said trip member while said supporting means is disposed adjacent its uppermost position.

14. A device as defined in claim 1 in which said agitator element has a shaft and a peripheral flange, and including annular cover means pivoted on and movable with said supporting means, said cover means closely surrounding said shaft and normally resting upon said flange, said cover means being engageable with the upper normally open end of a container mounted on said supporting means, said cover means and said shaft cooperating to close said open end.

15. A device as defined in claim 1 in which said agitator element has a shaft and a peripheral flange, and including: annular cover means pivoted on and movable with said supporting means, said cover means surrounding said shaft and normally resting upon said flange; and resilient means on said supporting means engageable with said cover means for pivoting the same in a direction to cause said cover means to engage the upper normally open end of a container mounted on said supporting means, said cover means and said shaft together closing the upper end of the container.

16. A mixing device for mixing a substance in a container, including: a vertically movable supporting means for receiving and supporting the container; mixing means provided with a rotary agitator element fixedly disposed above said supporting means and adapted to be disposed within the container and to stir the contents of the container when said supporting means is moved toward said mixing means; power means for rotating said agitator element; operating means for selectively energizing and de-energizing said power means; control means normally operative to prevent energization of said power means, said control means being adapted to be actuated in response to the combined acts of placing the container on said supporting means and predetermined upward movement of said supporting means to permit energization of said power means by said operating means; a holder member pivotally connected to and movable with said supporting means, said holder member having a pair of spaced arms; a cover member pivotally mounted between said arms; and resilient means engageable between said holder member and said supporting means and operative to normally pivot said holder member in a direction to cause said cover means to engage and close the upper normally open end of a container mounted on said supporting means.

17. A mixing device for mixing a substance in a container, including: a vertically movable supporting means for receiving and supporting the container; mixing means provided with a rotary agitator element fixedly disposed above said supporting means and adapted to be disposed within the container and to stir the contents of the container when said supporting means is moved toward said mixing means; power means for rotating said agitator element; operating means for selectively energizing and de-energizing said power means; control means normally operative to prevent energization of said power means, said control means being adapted to be actuated in response to the combined acts of placing the container on said supporting means and predetermined upward movement of said supporting means to permit energization of said power means by said operating means; a holder member pivotally connected to and movable with said supporting means, said holder member having a pair of spaced arms; a cover member pivotally mounted between said arms; resilient means engageable between said holder member and said supporting means and operative to normally pivot said holder member in one direction to cause said cover means to engage and close the upper normally open end of a container mounted on said supporting means; and means operative in response to upward movement of said supporting means for retaining said holder member in position to cause said cover means to close said container.

18. A mixing device for mixing a substance in a container, including: a vertically movable supporting means for receiving and supporting the container; mixing means provided with a rotary agitator element fixedly disposed above said supporting means and adapted to be disposed within the container and to stir the contents of the container when said supporting means is moved toward said mixing means; power means for rotating said agitator element; operating means for selectively energizing and de-energizing said power means; control means normally operative to prevent energization of said power means, said control means being adapted to be actuated in response to the combined acts of placing the container on said supporting means and predetermined upward movement of said supporting means to permit energization of said power means by said operating means; a holder member pivotally connected to and movable with said supporting means, said holder member having a pair of spaced arms; a cover member pivotally mounted between said arms; resilient means engageable between said holder member and said supporting means and operative to normally pivot said holder member in one direction to cause said cover means to engage and close the upper normally open end of a container mounted on said supporting means; means operative in response to upward movement of said supporting means for retaining said holder member in position to cause said cover means to close said container; and cooperating stop means on said holder member and said supporting means for limiting the pivotal movement of said holder member toward container closing position.

19. A mixing device for mixing a substance in a container, comprising: a housing having an opening in its side and an external surface providing a vertical track above said opening; supporting means movable vertically on said housing and adapted to support the container; mixing means including an agitator element rotatable on said housing above said supporting means and adapted to be disposed within the container so as to stir the contents thereof when said supporting means is moved upwardly toward said mixing means; power means for rotating said agitator element; operating means for selectively energizing and de-energizing said power means; a holder member pivoted on said supporting means; cover means pivoted on said holder member; and a roller on said holder member, said roller being disposed in alignment with said opening when said supporting means is in lowermost position and adapted to move into said opening to permit upward pivotal movement of said holder member to facilitate placing the container on said supporting means, said roller being adapted to engage and roll along said track when said supporting means is raised so as to prevent upward pivotal movement of said holder member during a mixing operation.

20. Cover means for a container having an open end, comprising: a pivoted holder member having spaced arms; a cover member provided at its sides with pivot means pivoted on said arms of said holder member, said cover member being disposed between said spaced arms and adapted, when said holder member is pivoted in one direction, to engage the open end of the container to close the same; carrier means for said holder member, and resilient means between said holder member and said carrier means normally operative to pivot said holder member in said one direction.

21. Cover means for a container having an open end, comprising: a pivoted holder member having spaced arms; a cover member provided at its sides with pivot means pivoted on said arms of said holder member, said cover member being disposed between said spaced arms and adapted, when said holder member is pivoted in one direction, to engage the open end of the container to close the same; carrier means for said holder member; resilient means between said holder member and said carrier means normally operative to pivot said holder member in said one direction; and releasable retaining means for retaining said holder member in a position in which said cover member engages the open end of the container.

ALLEN F. KIPPER.

REFERENCES CITED

The following references are of record in the file of this patent:

UNITED STATES PATENTS

| Number | Name | Date |
| --- | --- | --- |
| 1,109,828 | Goff | Sept. 8, 1914 |
| 1,700,729 | Gilchrist | Jan. 29, 1929 |
| 1,997,873 | Poplawski | Apr. 16, 1935 |
| 2,106,861 | Tofle | Feb. 1, 1938 |
| 2,108,238 | Strelow | Feb. 15, 1938 |
| 2,110,498 | Carnahan | Mar. 8, 1938 |
| 2,222,601 | Blish et al. | Nov. 26, 1940 |